W. BOATE.
Hose Carriage.
No. 91,705. Patented June 22, 1869.
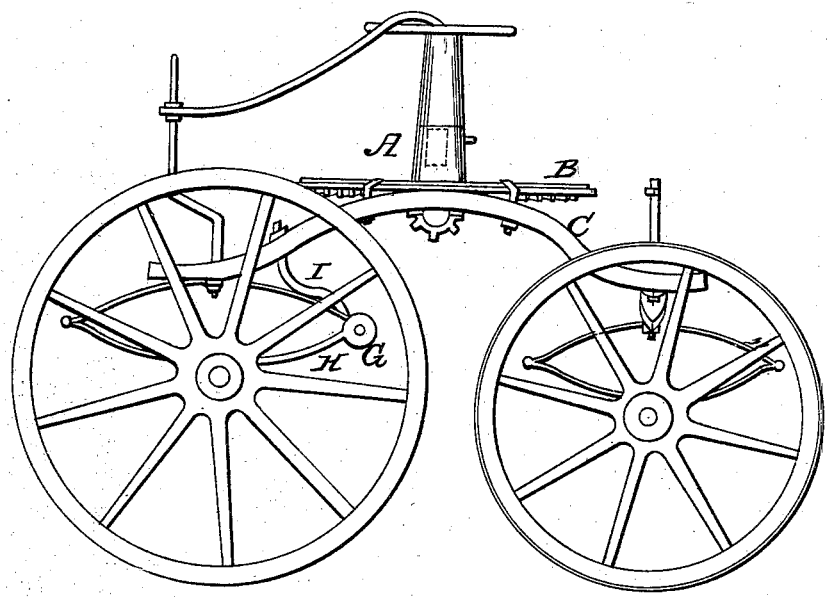
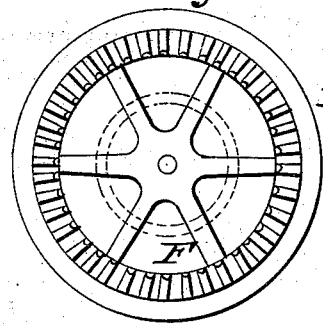
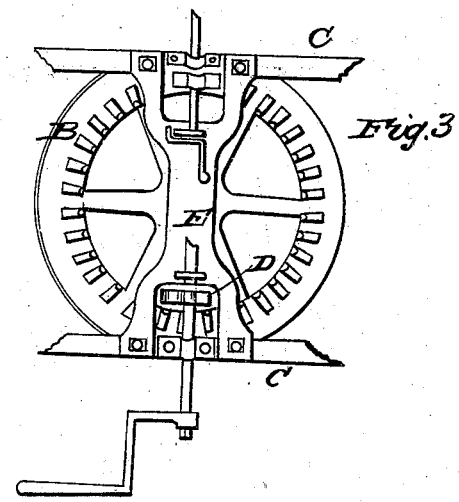

United States Patent Office.

WILLIAM BOATE, OF PHILADELPHIA, PENNSYLVANIA.

Letters Patent No. 91,705, dated June 22, 1869.

---

IMPROVEMENT IN HOSE-CARRIAGES.

---

The Schedule referred to in these Letters Patent and making part of the same.

---

*To all whom it may concern:*

Be it known that I, WILLIAM BOATE, of Philadelphia, in the county of Philadelphia, and State of Pennsylvania, have invented a new Reel for Winding Up Hose. The object attained is to facilitate the turning of the hose-carriage; and I do hereby declare that the following is a full and exact description thereof, reference being had to the accompanying drawings, and to the letters of reference marked thereon.

The nature of my invention consists in a horizontal reel for hose-carriages, with its necessary appendages, to facilitate the turning of the carriage in small streets or alleys.

To enable others skilled in the art to make and use my invention, I will proceed to describe its construction and operation.

First. A horizontal reel, with a perpendicular shaft, as shown at A, in the accompanying drawings. The base of reel A is in the form of a wheel, with rim sufficiently wide and strong to admit of cogs, as is shown in under-surface of rim, Figure 2, with arms extending from rim to centre-shaft. The upper surface of wheel B, fig. 2, to be level, to permit the hose being laid or taken up without detriment to the same. The under surface of the rim of the wheel, one-half of its width, is formed of a succession of cogs, connecting with a small pinion-cog on a small shaft, extending out sufficiently far to admit of a crank being turned, to clear the carriage-wheels, as is shown in Figure 3, shaft extending from the centre of arch or body C. The shaft is arranged so as to detach the small pinion-cog from the cogs on rim B, as is shown on fig. 3, D.

Second, a bar, extending from arch right to arch left, with four arms attached, with sufficient space between arms right and left to admit of the small pinion-cog being detached from the cogs on rim of wheel B, as is shown on fig. 3, D. A small recess in centre of bar E, to admit of a pivot on the centre of the wheel of reel, fig. 2, F, so that in the operation of the reel A, in laying or taking up of the hose, friction may be prevented materially, and wear of the cogs obviated.

All other carriages heretofore constructed with reels extending down, were placed in such a position as to prevent the wheels of the hose-carriage from being turned under, thus preventing the carriage from being turned without some loss of time and damage to the apparatus.

Third. I also claim, as a necessary appendage to my horizontal reel, a brace, I, extending from the back part of arch or body C, Figure 1, to friction-pulley G. fig. 1, attached to the front end of the back spring H, fig. 1, thereby getting the draught from the axle, and dispensing with the reach from axle to axle, permitting the front wheels to pass entirely around.

The upper section of perpendicular shaft of reel, as is shown in drawing, works loose, in a recess formed in the lower section of the reel, with ties or braces, extending from wheel on top of upper section, to the back brace on the carriage, thus to keep the upper section of the reel in position, while the lower section moves to facilitate the laying of the hose in time of fire. The forked knees J, fig. 1, are intended as guides for the rim of the reel, and are bolted fast, in connection with the bar, to the arch or body C, as is shown in fig. 1.

What I claim as my invention, and desire to secure by Letters Patent, is—

The arrangement of hose-carriage as constructed, in combination with the horizontal reel, with perpendicular shaft, substantially as and for the purpose set forth.

WILLIAM BOATE. [L. S.]

Witnesses:
SAMUEL T. BEESLEY,
J. R. MASSEY.